3,056,668
METHOD OF SEEDBED PREPARATION
Milton A. Sprague, Dayton, N.J., assignor, by mesne assignments, to Ansul Chemical Company, Marinette, Wis., a corporation of Wisconsin
No Drawing. Filed Feb. 19, 1959, Ser. No. 794,223
8 Claims. (Cl. 71—2.1)

This invention relates to seedbed preparation by application of cacodylic acid or its salts to sod. More specifically, this invention relates to treatment of permanent sod and pasture renovation. Further, the invention is useful in agriculture such as planting or sowing row crops following a cover crop or setting trees in either forests or orchards.

This invention is especially useful for replacing low producing grasses and weed species with more productive grasses and legumes without plowing. More specifically, this invention relates to the use of a herbicide to reduce the need for extensive tillage in seedbed preparation by the destruction of old vegetation.

Approximately 50 million acres of pasture land in the humid regions of the United States are subject to renovation. As livestock requirements on farms increase, pasture improvement by chemical renovation offers an effective means to supply this need. In the 12 Northeastern States alone there are about 17 million acres of pasture land, not counting the woodland pastures, and about 11.6 million acres or over two-thirds of the total is classified as unimproved. To improve these idle and unproductive grazing lands would require reseeding with tall growing, deep rooted, drought resistant grasses and legumes, plus the use of lime and fertilizer coupled with good management. Much of this area consists of stony, steep hillsides which makes the operation of plowing impractical and an erosional hazard.

According to the present invention, the use of cacodylic acid replaces a great deal of tractor power, heavy and sometimes unconventional equipment plus considerable labor for numerous trips over the field. The cacodylic acid applied by spraying to kill all existing vegetation, dissipates readily to permit reseeding within a reasonable length of time. Generally, a few cultivations are required following use of the chemical to mix in the fertilizers and cover the seed. The present invention provides effective means for complete control of all species in the sods to be renovated. My invention facilitates preparation of the sod for seedbed preparation with much less tillage, and in some cases no tillage, and reduced weed competition during the period of seedling establishment. I have found that the establishment of orchardgrass and Ladino clover is equally as successful on a seedbed prepared with two diskings of a killed sod as on a seedbed prepared in the conventional manner (10–12 diskings). There is almost no regrowth of the bluegrass sod on areas renovated with the chemical, but considerable regrowth on areas subjected only to tillage operations. This method of seedbed preparation is particularly applicable on areas where tillage operations are ineffective or hazardous. New seedlings including bromegrass, orchardgrass, alfalfa, bird's-foot trefoil, and Ladino clover indicate the method is applicable for use with most important forage species.

My method of pasture renovation results in evenly distributed surface mulch of dead plant materials which functions well for soil and water conservation. The mulch also presents many opportunities for the development of more effective seeding methods. Late winter clover seedings on a mulched surface are generally better than when made on bare soil.

Field trials in Pennsylvania and elsewhere have shown that any one of several implements prepares an adequate seedbed providing the existing vegetation was subdued sufficiently to prevent serious competition with the young seedlings. The best time for the initial break of the old sod in this region appears to be during July. Thus, the land can be reworked at least once or twice before seeding in order to turn up for desiccation those sods which have rerooted. Further tillage operations are required to smooth roughly turned sods.

In New Jersey, and elsewhere, trials have been carried on in an attempt to reduce the large amount of costly tillage required in this seedbed preparation. As the primary function of repeated disking has been to kill the old vegetation, chemicals of short duration in the soil have been applied with the aim of killing all vegetation present.

Dead sods have been found to respond far more readily to a disk than live sods and the tillage required has been primarily to provide coverage for the seed. The small amounts of tillage, however, do appear to aid the chemical in its action. Two or three diskings are generally sufficient to prepare an adequate seedbed for conventional broadcast or band seeding. Particularly effective in pressing the seed into the soil is a corrugated-roller-type seeder. Because the plants are dead there is no vegetative regrowth of the old sod from roots and rhizomes.

I have found that cacodylic acid is unusually effective for the renovation of permanent sod, such as pastures and other turf, which consists primarily of well-established perennial grasses and weeds with some annual grasses and forbes which need to be killed prior to reseeding. A sod of this type is generally considered permanent when it has been left unplowed for a period of approximately 5 years. Cacodylic acid is also very effective for use elsewhere in agriculture such as planting or sowing row crops following a cover crop of setting trees in either forests or orchards. For such purposes, cacodylic acid is applied in amounts up to 50 pounds per acre either alone or in combination with other herbicides in single or split applications at intervals, the specific rate depending upon the climate, soil, season and species to be treated. The cacodylic acid application is effective as an aid to seedbed preparation by killing all existing plants and also prevents competition from regrowth when reseeding a permanent sod.

The use of cacodylic acid offers a solution for the following problem:

The problem of weed competition is existent in practically all new seedings of forage species. The use of cacodylic acid immediately prior to seeding greatly reduces the weed population by eliminating young weed seedlings growing at the time the herbicide is applied. The split application of herbicides shows a beneficial effect from a chemical application just prior to seeding. The residue properties of cacodylic acid are such that applications up to 12 pounds per acre may be applied immediately before seeding the pasture species without noticeable effects on the subsequent seedlings.

Where renovation is carried on by disking the sod throughout the summer without first applying a chemical, the use of cacodylic acid at low rates immediately prior to seeding aids in eliminating the sod grasses which escape the effects of desiccation by the sun, and so aid in preparing a better, cleaner seedbed. It is not necessary that the cacodylic acid be applied as such, the salts of cacodylic acid also being effective herbicides. It is obviously necessary, however, to employ more of the salt on a pound basis to obtain an equal amount of the acid in the soil on a mole basis.

EXAMPLE 1

This example demonstrates the effects of cacodylic acid at the indicated rates on Kentucky bluegrass sod. This acid was applied at rates of 2½, 5, 10 and 15 lbs. per acre plus one-quarter of one percent added wetting agent. It was applied in 40 gal. of water per acre. Applications were made January 30, March 12 and April 20, 1957, on test plots on the Adams farm, Franklin Park, New Jersey. The soil was a Norton loam of the Pennsylvania series. These dates were selected to represent the different conditions of Kentucky bluegrass growth; January 30 representing winter dormancy; March 12, the period when bluegrass was just breaking winter dormancy; and April 20 when normal spring growth was underway. On April 20 the grass was in a vigorous growing condition and about 5-6 inches tall.

On May 16, 1957, all plots previously sprayed with 2½ and 5 lbs. cacodylic acid were split and one-half of each treated with an additional 2½ lbs. per acre of the acid.

The observed kill, the last week of April, on plots treated January 30 and March 12 with cacodylic acid showed no permanent control of the sod. The treatment on April 20 with this chemical gave the best kill of the vegetation. The 2½ and 5 lb. applications were estimated at 95 percent kill of the sod and this lasted for approximately 3 weeks from the time of application. The effects of the 10 lb. application lasted longer and during the last week of June the 15 lb. rate still showed little regrowth of bluegrass as well as good control of all vegetation.

EXAMPLE 2

This example demonstrates the effects of single and split applications of herbicides upon old pasture sod on Nixon sandy loam soil at the College Farm, New Brunswick, New Jersey. It demonstrates that the second application not only aids the kill of the established sod, but also eliminates some of the weed competition experienced.

First applications of chemicals were made on July 22, 1957, at a time when the grass was in a condition of summer dormancy. Second applications were made on September 3 when the grass was growing vigorously. The sod consisted of a mixture of Kentucky bluegrass, bromegrass and weeds pastured for three years previously with dairy cattle.

The several plots were treated as shown below.

*Table I*

SOD TREATMENTS

| Treatment | Sprayed [1] on July 22 | Sprayed [1] on September 3 |
|---|---|---|
| 1 | 5 lbs. cacodylic acid; ¼% wetting agent.[2] | 2 lbs. cacodylic acid; ¼% wetting agent.[2] |
| 2 | 12 lbs. cacodylic acid; ¼% wetting agent. | no treatment. |
| 3 | 5 lbs. sodium cacodylate; ¼% wetting agent. | 2 lbs. sodium cacodylate; ¼% wetting agent. |
| 4 | no treatment | no treatment. |

[1] Sprayed in 40 gallons of water per acre.
[2] Ultrawet—An aromatic mono sodiumsulfonate manufactured by Atlantic Refining Company.

Seeding was accomplished on September 3 placing 500 lbs. of 5-10-10 fertilizer in a van 3 inches below the seed. The seeding mixture consisted of 10 lbs. alfalfa, 2 lbs. Ladino clover, and 12 lbs. bromegrass per acre.

Fall seedling counts were made on October 10, 1957, four categories being used; grass weeds, broad leaf weeds, legumes and bromegrass seedlings.

*Table II*

SEEDLING COUNT [1]

| Treatment | Legume | Bromegrass | Broad Leaf Weeds | Grass Weeds |
|---|---|---|---|---|
| 1 | 11.7 | 6.7 | 8.7 | 13.3 |
| 2 | 8.0 | 4.7 | 4.0 | 33.3 |
| 3 | 2.3 | 2.7 | 3.3 | 31.0 |
| 4 | 1.0 | 1.0 | 3.7 | 75.0 |

[1] Average number of seedlings per two square feet on October 10.

The most effective treatment (No. 1) consisted of applications of a cacodylic acid at 5 lbs. per acre, applied on July 22, followed with 2 lbs. of cacodylic acid per acre the day of seeding, September 3. All chemicals were applied in 40 gal. of water per acre. Adequate control of the sod from these treatments enabled a more satisfactory establishment of seeded legumes and grasses, and decreased the amount of old sod regrowth.

Single applications of cacodylic acid (No. 2) and split applications of sodium cacodylate (No. 3) were less effective but still showed a marked improvement over the results obtained with no treatment at all (No. 4).

EXAMPLE 3

This example illustrates the increased effectiveness of sodium cacodylate and cacodylic acid resulting from a high rate of nitrogen fertilization. It further illustrates the advantages of split application of the herbicide.

Three rates of ammonium nitrate were applied at 0, 66 and 148 lbs. per acre on April 3, 1958, to randomly chosen sites in an old bluegrass pasture of Nixon sandy loam soil on the College Farm, New Brunswick, New Jersey. The herbicide indicated in Table III was applied on either May 14 or May 17, with follow-up treatment and seedings on June 6. The seeding consisted of Piper sudangrass at 35 lbs. per acre seeded in 10 inch bands with an International Harvester Pasture Renovator. The first forage harvest was made July 31, 1958; the second harvest September 5, 1958.

Development and yield of sudangrass is an index of effectiveness of the herbicide. Sudangrass seeded without tillage in all plots gave yields proportionate to the degree of kill experienced of the old sod. The use of nitrogen increased the growth of the sudangrass where the sod was effectively killed with the herbicide but had no apparent effect where the old sod was left alive. Competition of the perennial grass sod had the most pronounced effect on the growth and development of the sudangrass. Greater development of the sudangrass under the more favorable conditions took the form of both greater tiller growth and vigor of individual tillers. Height measurements varied from 11 inches to over 6 ft. Stand counts one month after seeding varied very little from an average of 5 to 14 depending again upon the effectiveness of kill of the perennial sod.

*Table III*

HERBICIDE EFFECT ON HARVEST YIELDS

[All figures—pounds per acre]

| Herbicide Treatments [1] | | Dry Matter | | | | | |
|---|---|---|---|---|---|---|---|
| | | First Harvest | | | Second Harvest | | |
| | | Rates of Nitrogen/Acre | | | Rates of Nitrogen/Acre | | |
| | | 0 lb. | 66 lbs. | 148 lbs. | 0 lb. | 66 lbs. | 148 lbs. |
| No treatment | | 64 | 31 | 67 | 84 | 76 | 138 |
| Cacodylic Acid | 12 lb. May 14 | 316 | 237 | 552 | 382 | 134 | 444 |
| Cacodylic Acid | 6 lb. May 14 | 91 | 155 | 253 | 91 | 129 | 191 |
| Cacodylic Acid | 3 lb. May 14 | 55 | 57 | 74 | 31 | 126 | 112 |
| Cacodylic Acid<br>Followed by | 5 lb. May 17<br>5 lb. June 6 | 1,344 | 1,434 | 2,223 | 402 | 1,180 | 810 |
| Cacodylic Acid<br>Followed by | 5 lb. May 17<br>2 lb. June 6 | 800 | 836 | 1,344 | 441 | 652 | 480 |
| Sodium Cacodylate<br>Followed by | 5 lb. May 17<br>2 lb. June 6 | 150 | 617 | 337 | 179 | 512 | 422 |
| Cacodylic Acid<br>Followed by | 3 lb. May 17<br>2 lb. June 6 | 388 | 782 | 990 | 182 | 512 | 437 |
| Cacodylic Acid<br>Followed by | 5 lb. May 17<br>1 lb. June 6 | 488 | 649 | 785 | 434 | 480 | 724 |
| No treatment | | 136 | 136 | 22 | 111 | 154 | 86 |

[1] Sprayed in 40 gallons of water per acre.

I may also use water-soluble salts of cacodylic acid such as sodium cacodylate based on cacodylic acid equivalent. The cacodylic acid or the salts are preferably applied in aqueous solutions, but they may also be applied in solid particulate form as such or admixed in solid carriers such as talc, clays, diatomaceous earth and fertilizer materials with or without suitable surface active ingredients.

It will be apparent from the foregoing data that my invention provides a very effective process for seedbed preparation, the treatment of permanent sod, pasture renovation, and controlling the growth of grasses and weed species with more productive grasses and legumes without plowing.

I claim:

1. The process of planting desirable crops in land covered by sod which comprises applying a plurality of periodically-spaced applications of a composition comprising cacodylic acid to the sod, the amount of cacodylic acid applied being sufficient to inhibit the growth of the undesirable plant materials making up the sod, and the period between applications being measured in a time unit of at least days, and shortly after said applications planting the desirable crops in the land.

2. The process of claim 1 wherein at least two periodically spaced applications of the composition comprising cacodylic acid are applied to the sod and the desirable crops are planted at the time of the last application.

3. The method of claim 1 wherein a total of up to about 50 pounds per acre of cacodylic acid is applied to the land prior to planting of the crops.

4. The method of claim 2 wherein up to about 12 pounds per acre of cacodylic acid is applied to the land during each application.

5. The method of claim 1 wherein the cacodylic acid is applied as a water-soluble salt of cacodylic acid which has effective herbicidal properties.

6. The process of claim 1 wherein the desirable crops are planted simultaneously with the last application of the composition comprising cacodylic acid.

7. The process of claim 1 wherein the desirable crops are forage crops.

8. The process of planting desirable crops in land covered by sod which comprises applying a plurality of periodically-spaced applications of a composition comprising sodium cacodylate to the sod, the amount of sodium cacodylate applied being sufficient to inhibit the growth of the undesirable plant materials making up the sod, and the period between applications being measured in a time unit of at least days, and shortly after said applications planting the desirable crops in the land.

References Cited in the file of this patent

Skogley et al. in "Proceedings of the Ninth Annual Meeting Northeastern Weed Control Conference," Hotel New Yorker, New York City, January 1955, pages 401 to 405.